(12) United States Patent
Wang

(10) Patent No.: US 12,337,959 B2
(45) Date of Patent: Jun. 24, 2025

(54) VTOL BOX-WING MULTIROTOR AERIAL VEHICLE

(71) Applicant: Xi Wang, Saint-Laurent (CA)

(72) Inventor: Xi Wang, Saint-Laurent (CA)

(*) Notice: Subject to any disclaimer, the term of this patent is extended or adjusted under 35 U.S.C. 154(b) by 160 days.

(21) Appl. No.: 18/091,359

(22) Filed: Dec. 29, 2022

(65) Prior Publication Data

US 2024/0217652 A1    Jul. 4, 2024

(51) Int. Cl.
| | |
|---|---|
| *B64C 29/00* | (2006.01) |
| *B64C 1/00* | (2006.01) |
| *B64C 3/16* | (2006.01) |
| *B64C 9/00* | (2006.01) |
| *B64C 11/48* | (2006.01) |
| *B64C 27/22* | (2006.01) |

(52) U.S. Cl.
CPC ............ *B64C 29/0008* (2013.01); *B64C 1/00* (2013.01); *B64C 3/16* (2013.01); *B64C 9/00* (2013.01); *B64C 11/48* (2013.01); *B64C 27/22* (2013.01); *B64C 2009/005* (2013.01)

(58) Field of Classification Search
CPC ..... B64C 39/068; B64C 29/0008; B64C 1/00; B64C 3/16; B64C 9/00; B64C 11/48; B64C 27/22; B64C 2009/005; B64C 11/28; B64D 25/12; B64U 30/293
See application file for complete search history.

(56) References Cited

U.S. PATENT DOCUMENTS

| | | | | |
|---|---|---|---|---|
| 3,053,480 | A * | 9/1962 | Vanderlip | B64U 30/297 244/17.13 |
| 3,834,654 | A * | 9/1974 | Miranda | B64C 39/068 244/45 R |
| 5,503,352 | A * | 4/1996 | Eger | B64C 39/12 244/45 R |
| 9,004,396 | B1 * | 4/2015 | Colin | B64U 30/293 244/17.23 |
| 10,364,036 | B2 * | 7/2019 | Tighe | B64C 29/0025 |
| 10,981,650 | B2 * | 4/2021 | Fink | B64C 27/22 |
| 10,994,829 | B2 | 5/2021 | Duffy | |
| 11,273,922 | B2 * | 3/2022 | Bevirt | B64C 11/28 |
| 2010/0108801 | A1 * | 5/2010 | Olm | B64U 50/19 244/17.23 |

(Continued)

FOREIGN PATENT DOCUMENTS

WO   WO-2020069582 A1 * 4/2020 ........... B64C 23/069

*Primary Examiner* — Joshua J Michener
*Assistant Examiner* — Cindi M Curry

(57) ABSTRACT

A VTOL (vertical take-off and landing) box-wing aerial vehicle with multirotor to provide VTOL flight includes a detachable cabin, fuselage base, a pair of first wings extending outward from the upper portion of the fuselage and a pair of second wings extending outwardly and from the lower portion of the fuselage. The first and second wings are spaced apart longitudinally and vertically. The pylon joints the first wing and second wing at the tip to form the box-wing. The pylon includes heading control rudder. Secured to the wing or pylon or both wing and pylon, a fixed rotor boom extending longitudinally to support a plurality of lift rotors for VTOL flight. In one configuration, the rotor boom is pivotable. Finally, the fuselage mounted push rotor propels the vehicle forward to generate lift from the wings. Furthermore, the wings are equipped with elevators and ailerons for flight control.

9 Claims, 8 Drawing Sheets

(56) References Cited

U.S. PATENT DOCUMENTS

| | | | |
|---|---|---|---|
| 2014/0061367 A1* | 3/2014 | Fink | B64C 27/26 |
| | | | 244/6 |
| 2017/0043870 A1* | 2/2017 | Wu | B64U 30/291 |
| 2018/0170510 A1* | 6/2018 | Brock | B64U 50/19 |
| 2020/0164993 A1* | 5/2020 | Bevirt | B64C 39/068 |
| 2021/0031909 A1* | 2/2021 | Pachidis | B64C 27/26 |
| 2021/0387721 A1* | 12/2021 | Tian | B64U 30/20 |
| 2022/0089279 A1* | 3/2022 | Rosen | B64U 70/80 |
| 2022/0258857 A1 | 8/2022 | Parks | |
| 2024/0262499 A1* | 8/2024 | Kowald | B64U 30/293 |

\* cited by examiner

VTOL BOX-WING MULTIROTOR AERIAL VEHICLE

BACKGROUND ON INVENTION

1. Field of Invention

The disclosed invention relates to a VTOL (vertical take-off and landing) box-wing aerial vehicle, and more specifically to the configuration of the box-wing airframe with multiple rotors for VTOL flight and fixed pusher rotor for forward flight.

2. Discussion of the State of the Art

The helicopter is an essential modern air transportation vehicle. Technically, helicopter with rotary wing is also referred as "rotorcraft" or "rotary wing vehicle". The rotary wing is commonly referred as "rotor". Rotary wing positioned in the center of a shroud is called "ducted fan". In general, rotary wing comprising of a plurality of blades rotating about the same axis. The rotary movement of the blades generates thrust by moving air. The rotary wing permits the helicopter to land and take-off vertically without the presence of a long runway. Disadvantageously, helicopter with fossil fuel engine is associated with expensive operational cost, undesirable high level of noise and carbon emission.

As the traffic is increasing heavier in the global urban area, an affordable electrical VTOL vehicle is a solution to avoid congestion on the road. Without traffic delay, an electrical VTOL vehicle can also operate as law enforcement vehicle, ambulance and medical cargo transporter. A new term UAM (urban air mobility) has been adopted for this new type of aerial transportation.

The arrival of distributed electrical propulsion system allows modern VTOL multirotor vehicle to substitute for the traditional helicopter. The VTOL multirotor rotorcraft is advantageous for safety redundancy, in comparison to a single large rotor helicopter. The electrical propulsion system contains multiple independent smaller rotors to provide lift, propulsion and steering control. Quad-rotorcraft is a popular design for electrical multirotor vehicle, a simple design comprises of four moving rotors. The fixed pitch smaller rotor has low inertia, which allows the speed of the rotating blade to be decreased or increased rapidly. The modulation of the power setting on the rotors provides agile lift, propulsion and steering control. The disadvantage of the four rotors propulsion is that the rotor is smaller in diameter. Based on the momentum theory, a small diameter rotor has low thrust lift efficiency, due to the high disc loading.

Advantageously, modern electrical VTOL vehicle also has the capability to transition to airplane mode for forward flight. The energy required for VTOL flight is significantly higher than the energy required for a fixed-wing airplane flight to maintain forward flight. The VTOL vehicle can experience the following three types of flight mode: thrust borne, partial wing borne and wing borne. The vehicle is thrust borne in VTOL flight, which means the flight is made possible by vertical rotor thrust. The vehicle is partial wing borne, which means the flight is made possible by the combination of vertical rotor thrust and wing lift. The vehicle is wing borne in airplane flight, which means the flight is made possible by lift generated by the wing. Furthermore, the forward propulsive movement in the airplane mode is generated by at least one pusher rotor. The main challenge of transitional capability is the rapid handover from thrust borne flight to wing borne flight. The desirable solution is to design the vehicle with partial wing borne flight capability between the transition of thrust borne flight to wing borne flight.

Traditional fixed-wing aircraft suffers from significant loss of lift efficiency at the tip of the wings, due to the occurrence of vortex. As a result, winglet, sharklet and box-wing design is introduced to improve lift efficiency.

BRIEF SUMMARY OF THE INVENTION

In one embodiment of the invention of a box-wing multirotor vehicle with both VTOL and airplane forward flight capability is provided, comprising a detachable cabin, a fuselage base having a longitudinal axis, a fixed wings having a biplane arrangement, a pylon secured to the fixed wings at the tip, a pair of rudder, a pair of rotor boom, a pair of forward contra-rotating lift rotor, a pair of rear contra-rotating lift rotor, a main landing gear pad or wheel, a horizontal and vertical stabilizer, a pusher rotor, and a nose landing gear pad or wheel. Also in one embodiment the detachable cabin is separable from the box-wing multirotor vehicle for ground transportation.

In another embodiment of the invention of a box-wing multirotor vehicle with both VTOL and airplane forward flight capability is provided, comprising a detachable cabin, a fuselage base having a longitudinal axis, a fixed wings having a biplane arrangement, a pylon secured to the fixed wings at the tip, a pair of rudder, a pair of rotor boom, having fixed rotor boom and pivotable rotor booms, a pair of forward lift rotor mounted on the rotor boom, a pair of forward lift rotor mounted on the pivotable rotor boom, a pair of rear lift rotor mounted on the rotor boom, a pair of rear lift rotor mounted on the pivotable rotor boom, a main landing gear pad or wheel, a horizontal and vertical stabilizer, a pusher rotor, and a nose landing gear pad or wheel.

BRIEF DESCRIPTION OF THE DRAWINGS

Regarding the invention disclosure, the feature and advantage of the invention are particularly pointed and distinctly claimed in the claims. Detailed description and methods are given to provide further comprehension of the functionality of the invention. It should be observed that three mutual orthogonal directions X, Y, and Z are shown in some of the FIGURES. The first direction X is said to be "longitudinal", and the forward side is referenced to be positive. Rotational movement around the longitudinal axis is said to be "roll". The second direction Y is said to be "transverse', and the port side is referenced to be positive. And the Y plane is referenced as centerline of the vehicle. Rotational movement around the transverse axis is said to be "pitch". Finally, the third direction Z is said to be "vertical", and the upside is referenced to be positive. Rotational movement around the vertical axis is said to be "yaw". Furthermore, the direction of motion is shown in dash arrow and axis of rotation is shown in dot dash line.

DETAILED DESCRIPTION OF THE EMBODIMENTS

Advantageously, VTOL (vertical take-off and landing) vehicle can operate without a long runway. However, VTOL flight requires significantly higher energy than the energy required for a fixed wing aircraft to maintain forward flight. Therefore, the usefulness of VTOL vehicle is limited to short range flight. Modern VTOL is commonly designed with electrical power plant. In order to reduce the weight of electrical energy storage, an efficient VTOL vehicle can convert to airplane configuration for long range forward fight. In the disclosure of the invention, the technical term rotary wing is referred as "rotor", and a rotary wing dedicated to produce lift is referred as "lift rotor".

Figure 1:
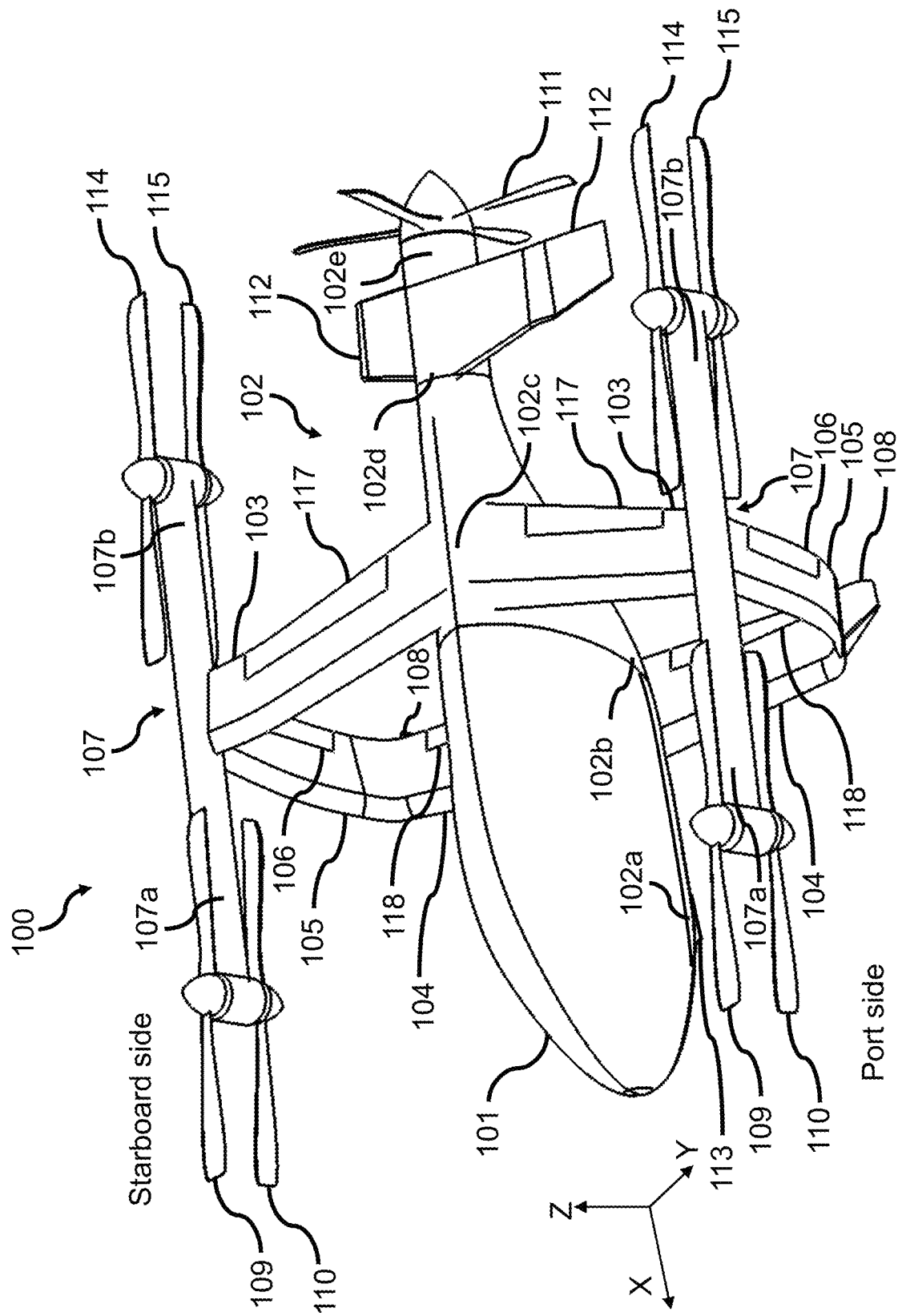
FIG. 1 is a perspective view of a box-wing multirotor vehicle in accordance to an embodiment of the present invention.

As shown in FIGS. 1 to 4, the embodiment of box-wing multirotor 100. FIG. 1 shows a perspective view of embodiment 100. The aerial vehicle is shown in the usual way, the fuselage of the box-wing multirotor vehicle 100 comprises of a detachable cabin 101 and the fuselage base 102. The fuselage base 102 includes a nose portion 102a, a lower portion 102b, an upper portion 102c, a rear portion 102d and a tail portion 103e. The upper portion 102c of the fuselage base 102 is provided with upper wing 103 and the lower portion 102b of the fuselage base 102 is provided with lower wing 104. The upper wing 103 is provided with elevator 117, and the lower wing 104 is provided with aileron 118. The upper wing 103 and lower wing 104 are joined at the distal end by the pylon 105 to form the box-wing structure. The pylon 105 is provided with the heading control rudder 106. The joint of the pylon 105 and upper wing 103 is provided with the rotor boom 107. The joint of the pylon 105 and lower wing 104 is provided with the main landing gear 108. It can also be a landing wheel. The forward structure of the rotor boom 107a forward of the upper wing 103 is provided with the forward contra-rotating lift rotors, which comprises of the forward upper lift rotor 109 and forward lower lift rotor 110, and it may possibly be ducted fan. The rear structure of the rotor boom 107b aftward of the upper wing 103 is provided with the rear contra-rotating lift rotors, which comprises rear upper lift rotor 114 and rear lower lift rotor 115, and it may possibly be ducted fan. In the rear portion 102d of the fuselage base 102 is provided with the horizontal and vertical stabilizer 112. At the tail portion 102e of the fuselage base 102 is provided with the pusher rotor 111. At the nose portion 102a of the fuselage base 102 is provided with nose landing gear 113. It can also be a landing wheel.

Figure 2:
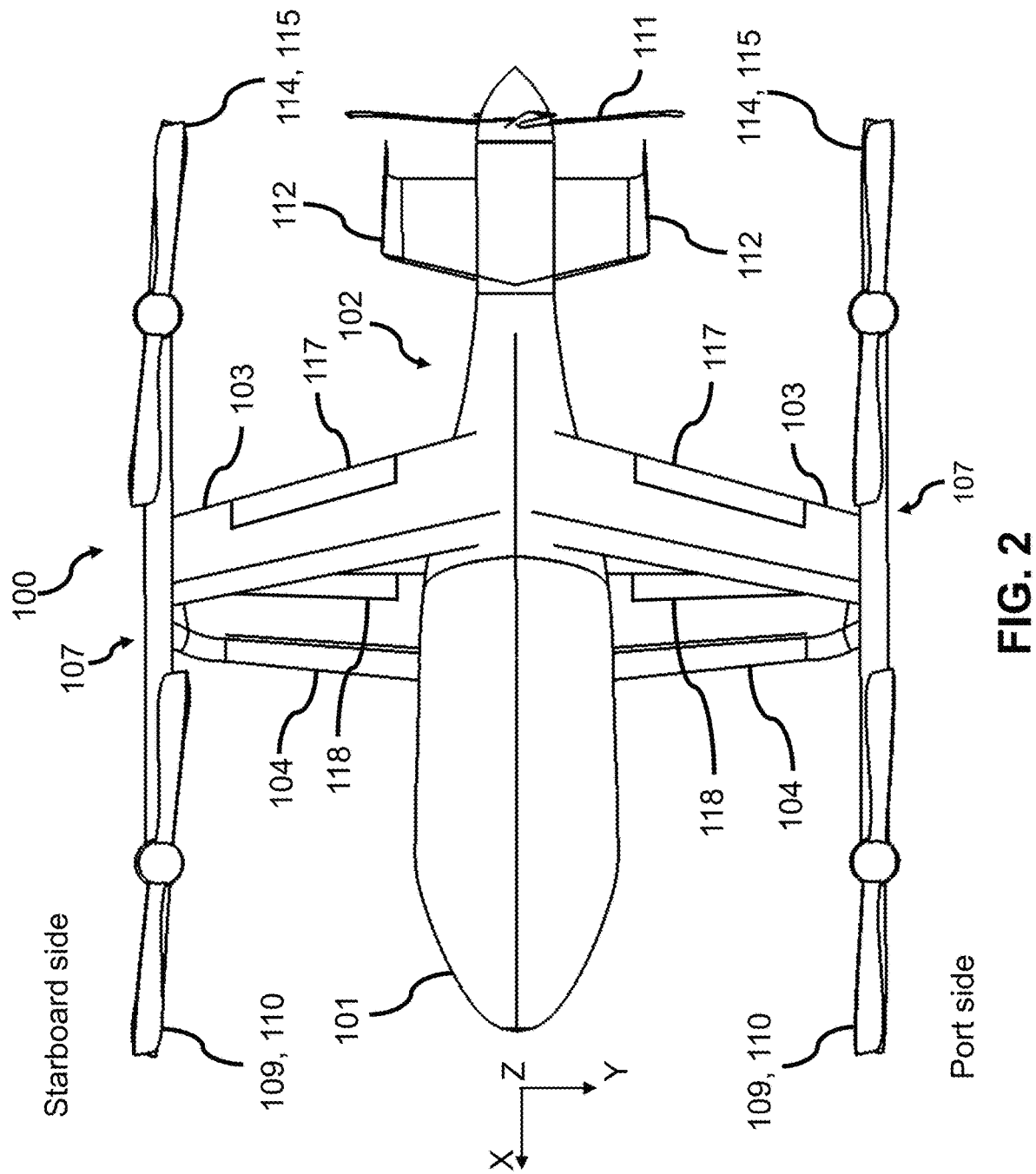
FIG. 2 is a top plane view of the box-wing multirotor vehicle of FIG. 1.

FIG. 2 shows the top plane view of embodiment 100. The wings of the box-wing multirotor vehicle 100 comprises of the articulated upper wing 103 sweeps forward from the top portion 102c (shown in FIG. 1) of the fuselage base 102. The articulated lower wing 104 sweeps aftward from the lower portion 102b (shown in FIG. 1) of the fuselage base 102. The wing can also be dihedral or anhedral. The opposite sweeps of the upper wing 103 and lower wing 104 permits optimum advantages of uniform airflow around the two main wings.

Figure 3:
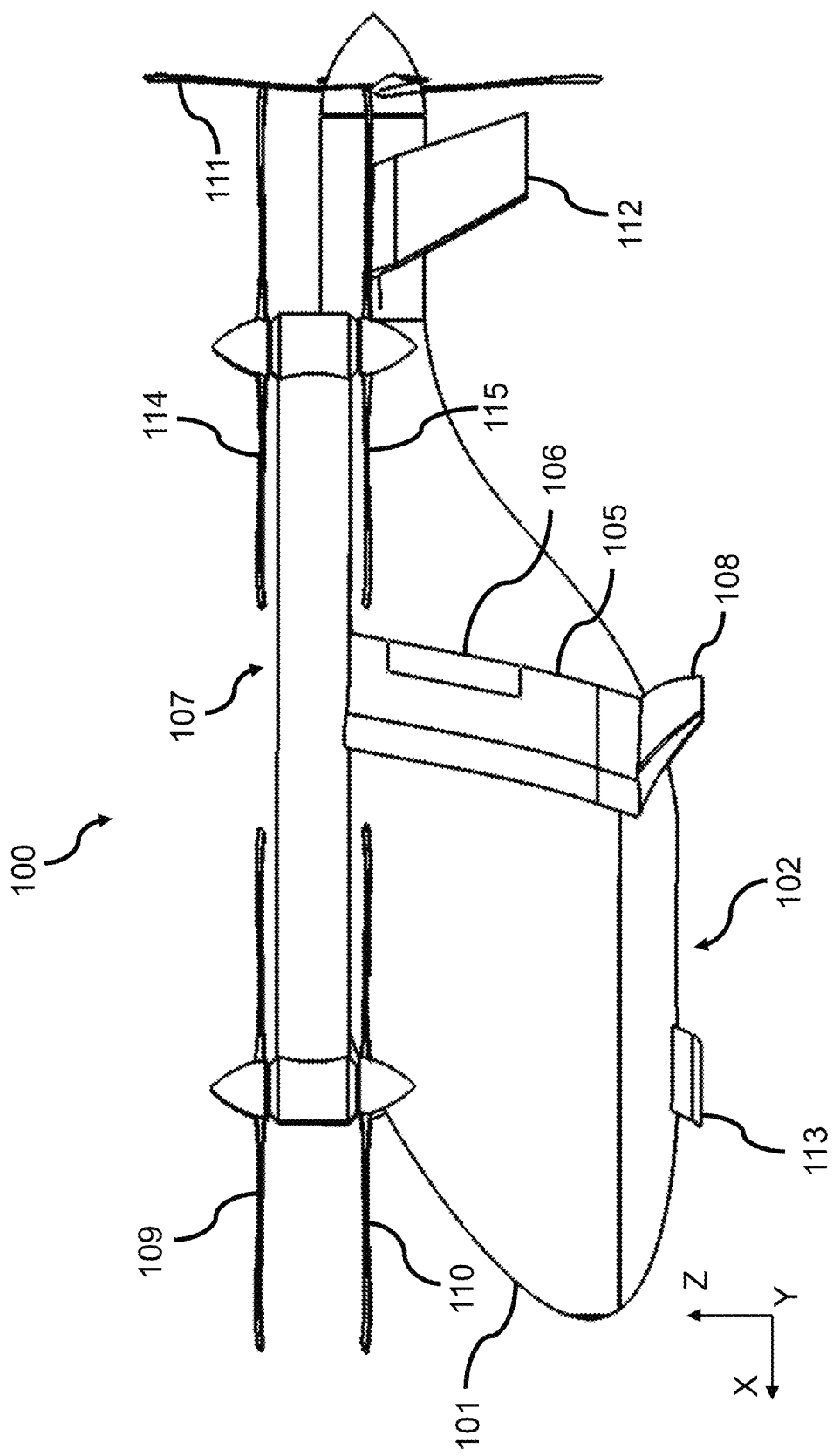
FIG. 3 is a side view of the box-wing multirotor vehicle of FIG. 1.

FIG. 3 shows a side view of the embodiment for clarity.

Figure 4:
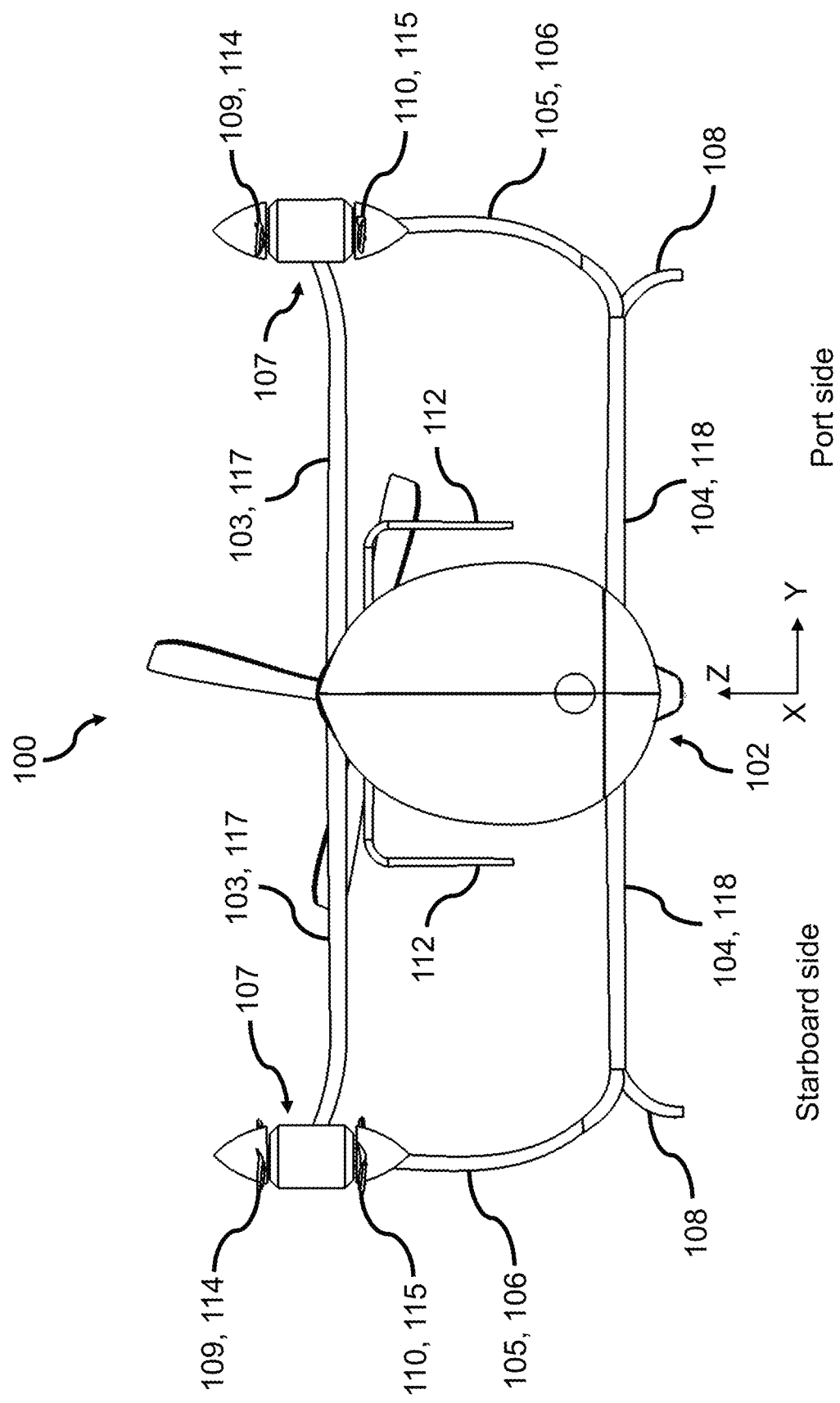
FIG. 4 is a frontal view of the box-wing multirotor of FIG. 1.

FIG. 4 shows the front view of embodiment 100. It can be observed that the following components of the box-wing multirotor vehicle 100 are duplicated and symmetrical located on opposing sides of the Y plane. These components include the upper wing 103, lower wing 104, pylon 105, rudder 106, rotor boom 107, main landing gear pad 108, forward upper lift rotor 109, forward lower lift rotor 110, rear upper lift rotor 114, rear lower lift rotor 115, horizontal and vertical stabilizer 112, elevator 117 and aileron 118.

The operation of the box-wing multirotor vehicle 100 is described in the following sections. Advantageously, the box-wing multirotor vehicle 100 has four dedicated contra-rotating lift rotors to operate in VTOL flight (thrust borne flight). Naturally, the quad contra-rotating lift rotors provide the thrust vector during VTOL flight for taking-off, landing, hovering, and flying vertically. Moreover, the torque effect of the lift rotors assists the vehicle to change yaw heading. In order to transition from VTOL flight (thrust borne flight) to airplane flight (wing borne flight), the pusher rotor 111 propels the vehicle forward. Upon reaching the desired forward cruise speed, lift rotors 109, 110, 114 and 115 becomes unpowered. As a result, the absence of rotor slipstream allows undisturbed ram airflow interacting with the upper wing 103 and lower wing 104 to generate airfoil lift. Finally, the VTOL flight is fully transitioned to airplane flight when the airborne lift force is fully provided by the upper wing 103 and lower wing 104. During airplane flight, the blades of the lift rotor 109, 110, 114 and 115 are stowed in parallel with the longitudinal axis to reduce aerodynamic drag. Furthermore, the rudder 106, elevator 117 and aileron 118 provide the flight control surfaces to steer the vehicle in the pitch, roll and yaw axis. Moreover, horizontal and vertical stabilizer 112 provides directional stability during airplane flight and might have hinged trim tabs to tune the heading, levelling, speed and attitude of the vehicle.

Figure 5:
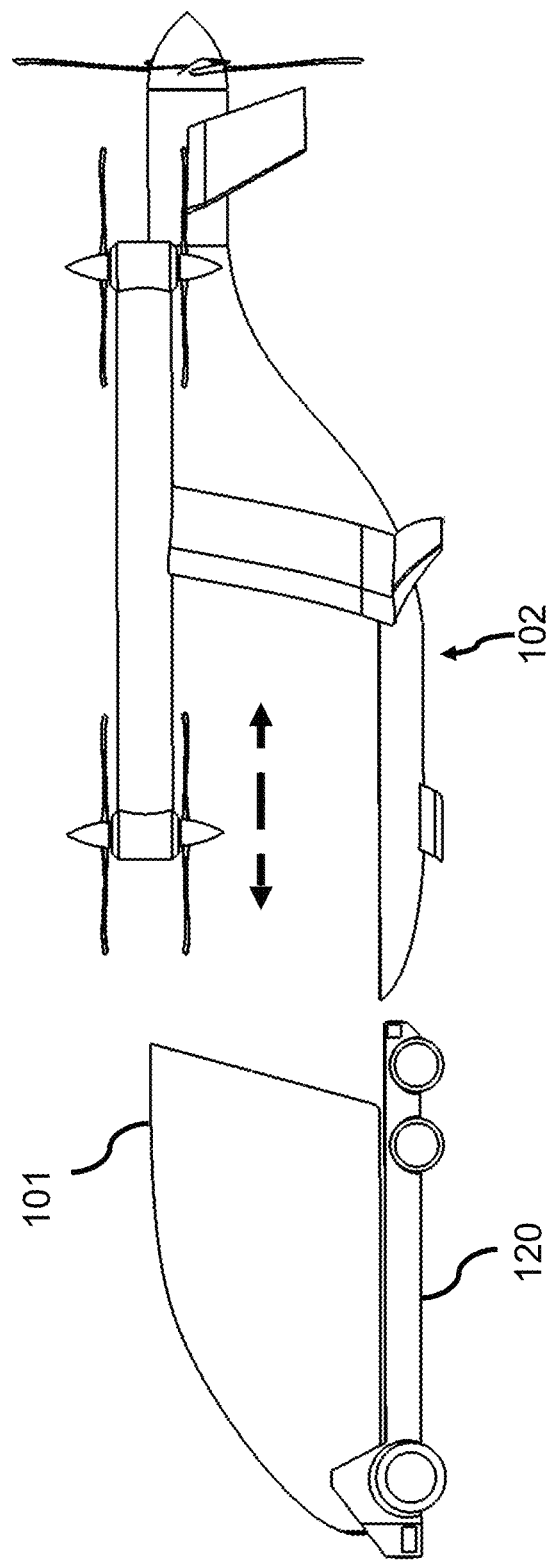
FIG. 5 is a side view of the embodiment of the box-wing multirotor vehicle of FIG. 1 depicting the capability of separating the cabin from the fuselage base.

FIG. 5 illustrates the embodiment of the detachable cabin 101 separated from fuselage base 102. Firstly, in one aspect, a rail system between the detachable cabin 101 and fuselage base 102 allows the detachable cabin 101 to slide forward out from fuselage base 102. Secondly, upon separating from the fuselage base 102, the detachable cabin 101 can be loaded on the flat bed of a specialized ground car 120. As a result, this feature allows the payload to be hauled to the final destination without being unloaded from the detachable cabin 101. Advantageously, it allows a quick change of payload between flight. The multirole cabin can be configurated to accommodate payload such as passenger, cargo, energy storage and airborne equipment, but not limited to the described payload.

Figure 6:
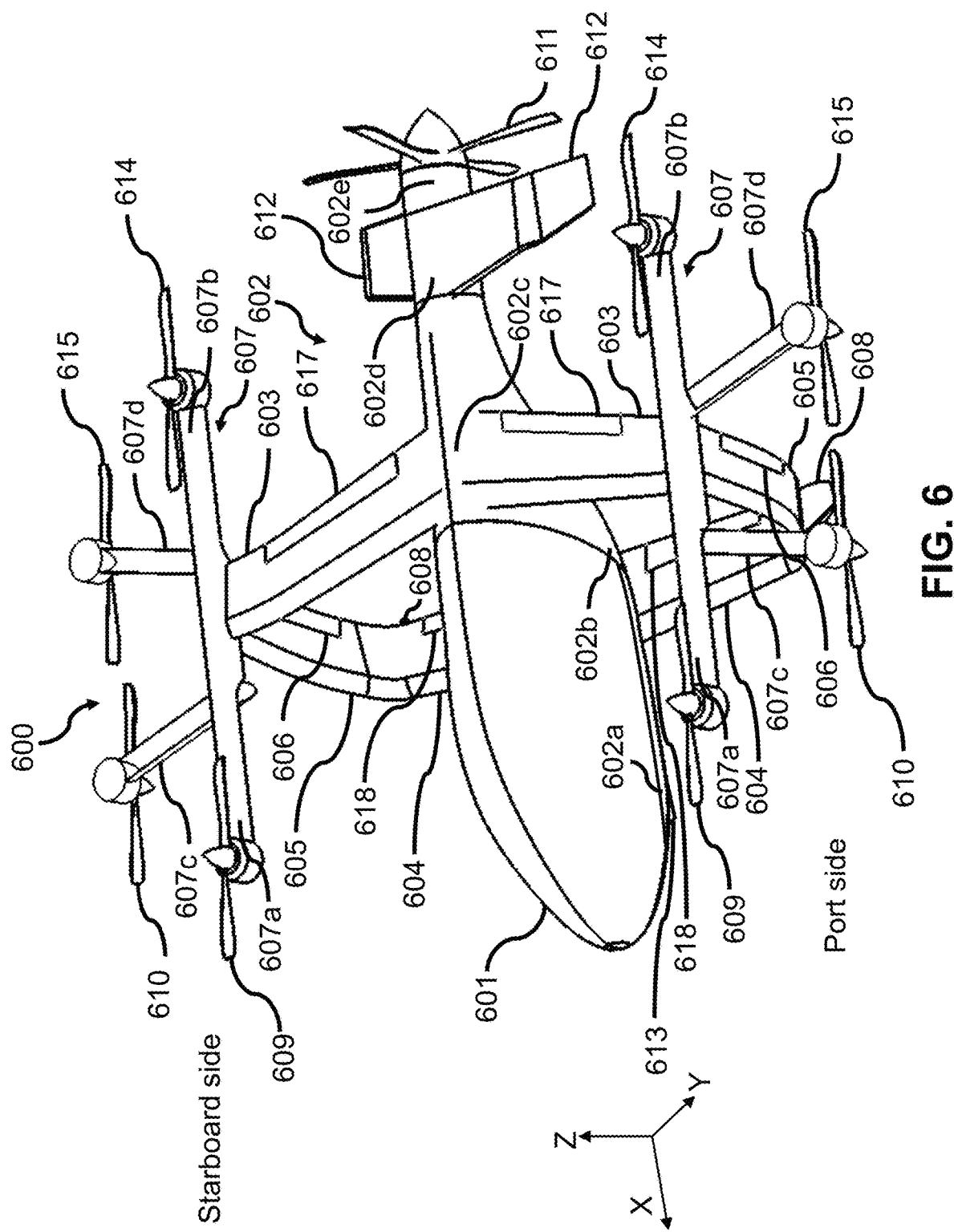
FIG. 6 is a perspective view of another box-wing multirotor vehicle in VTOL flight configuration.
Figure 7:
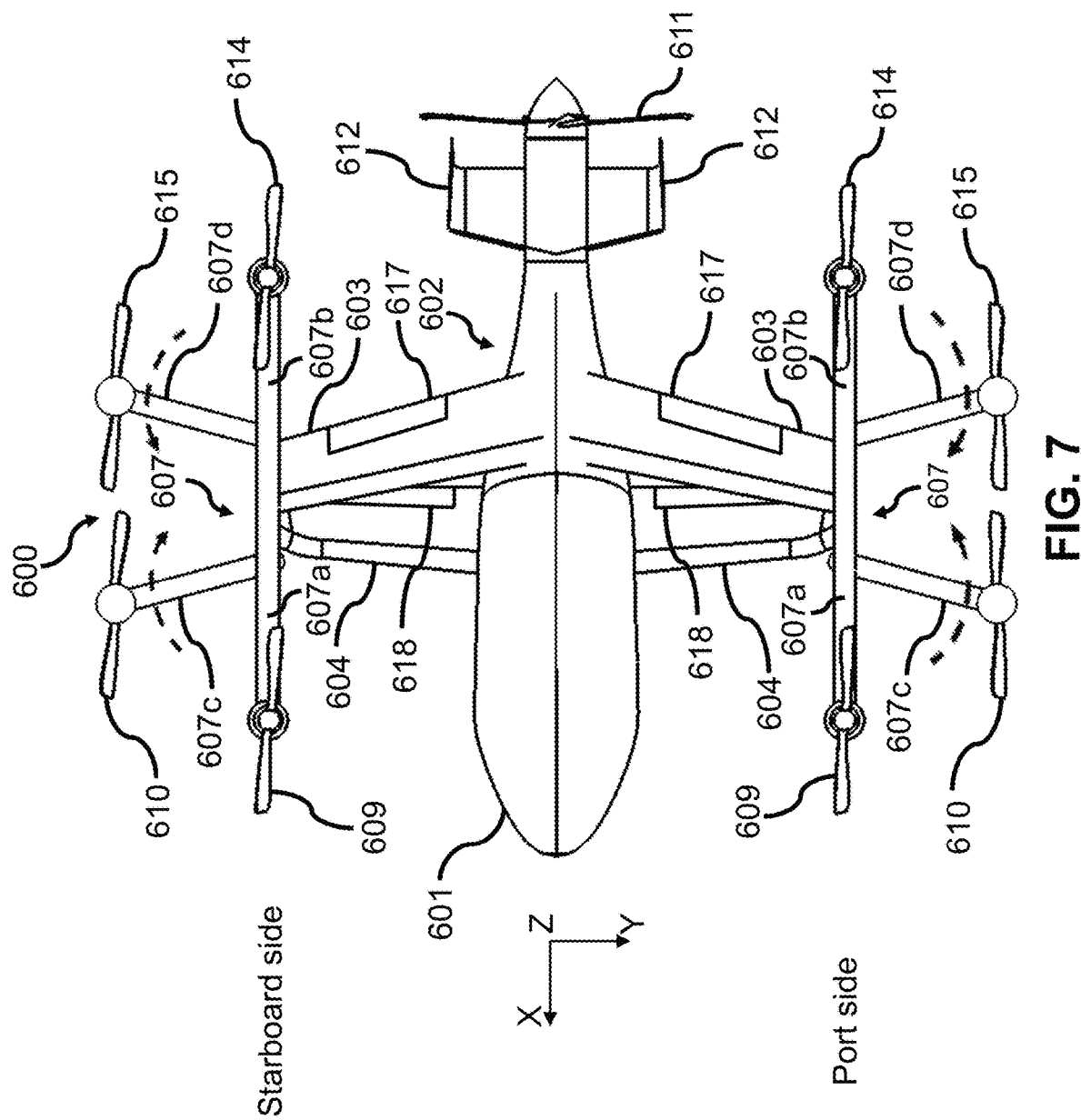
FIG. 7 is a top plan view of the box-wing multirotor vehicle of FIG. 6.
Figure 8:
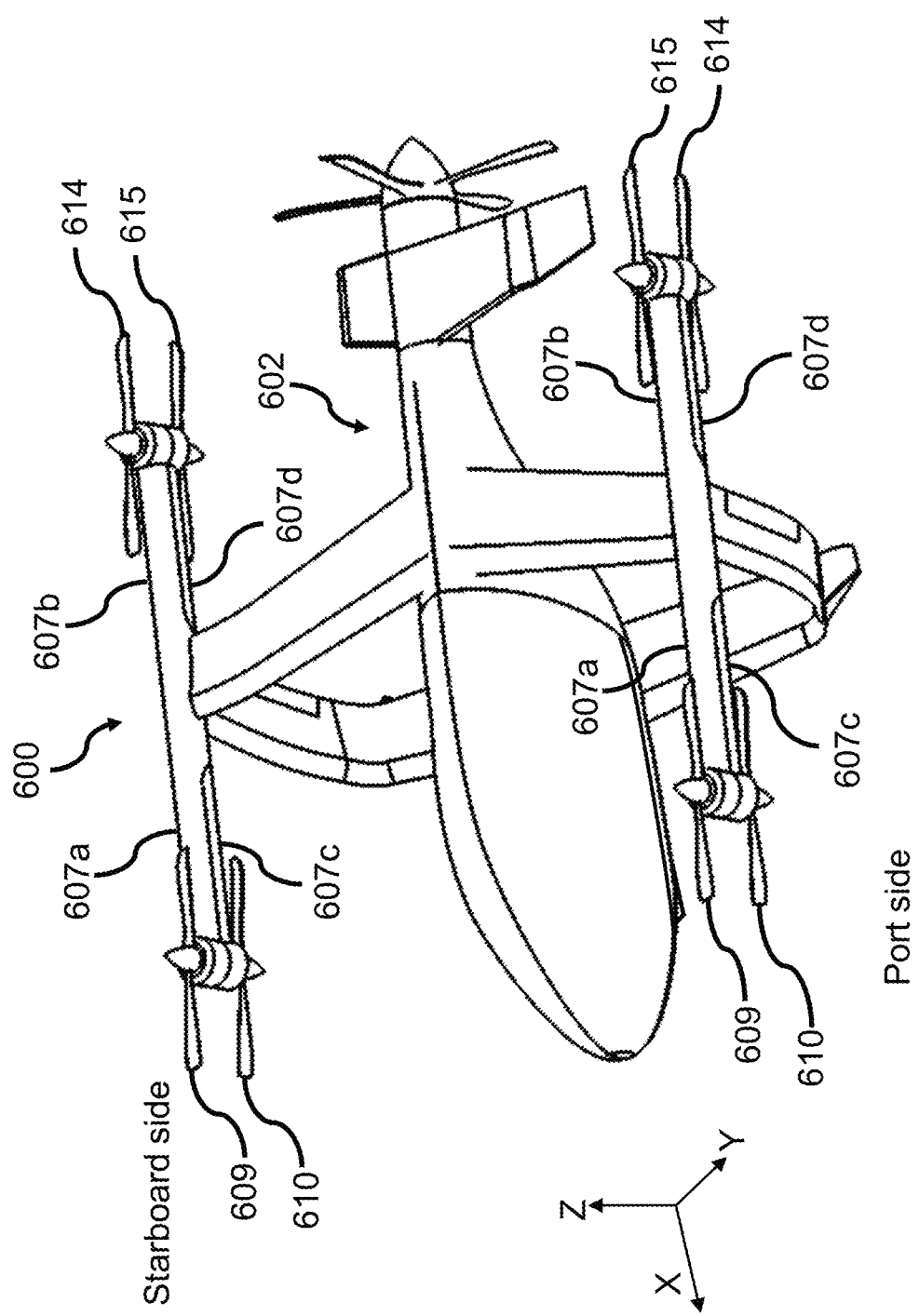
FIG. 8 is a perspective view of box-wing multirotor vehicle of FIG. 6 in airplane flight configuration.

As shown in FIGS. 6 to 8, the embodiment of box-wing multirotor 600. FIG. 6 shows a perspective view of the embodiment 600 in VTOL flight configuration. In comparison to embodiment 100, it can be observed that embodiment 600 comprises of the optional feature of pivotable rotor boom with respect to a vertical axis. The fuselage of the box-wing multirotor vehicle 600 comprises of a detachable cabin 601 and the fuselage base 602. The fuselage base 602 includes a nose portion 602a, a lower portion 602b, an upper portion 602c, a rear portion 602d and a tail portion 603e. The upper portion 602c of the fuselage base 602 is provided with upper wing 603 and the lower portion 602b of the fuselage base 602 is provided with lower wing 604. The upper wing 603 and lower wing 604 are joined at the tip by the pylon 605 to form the box-wing structure. The pylon 605 is provided with a heading control rudder 606. The joint of the pylon 605 and upper wing 603 is provided with the rotor boom 607. The joint of the pylon 605 and lower wing 604 is provided with the main landing gear 608. It can also be a landing wheel. The rotor boom 607 forward of the upper wing 603 is provided with the forward contra-rotating lift rotors, which comprise of the forward upper lift rotor 609 secured to the forward fixed rotor boom 607a and forward lower lift rotor 610 secured to the forward pivotable rotor boom 607c. It can also be ducted fan. The rotor boom 607 aftward of the upper wing 603 is provided with the rear contra-rotating lift rotors, which comprise of the rear upper lift rotor 614 secured to the rear fixed rotor boom 607b and rear lower lift rotor 615 secured to the rear pivotable rotor boom 607d. It can also be ducted fan. The forward pivotable rotor boom 607c and rear pivotable rotor boom 607d are shown in the deployed position. The rear portion 602d of the fuselage base 602 is provided with the horizontal and vertical stabilizer 612. At the tail portion 602e of the fuselage base 602 is provided with the pusher rotor 611. At the nose portion 602a of the fuselage base 602 is provided with nose landing gear pad 613. It can also be a landing wheel.

FIG. 7 shows the top plane view of the embodiment 600. The dash arrows show the direction of motion of the forward pivotable rotor boom 607c and rear pivotable rotor boom 607d from stowed to deployed position.

FIG. 8 shows a perspective view of the embodiment 600 in airplane flight configuration. It can be observed that forward pivotable rotor boom 607c and rear pivotable rotor boom 607d are shown in the stowed position.

The VTOL flight (thrust borne flight) of the box-wing multirotor vehicle 600 is described in the following sections. As shown in FIG. 6, the box-wing multirotor vehicle 600 has eight dedicated lift rotors to operate in VTOL flight (thrust borne flight). Naturally, the eight lift rotors inherited higher propulsion efficiency and lower rotor noise due to the reduction of rotor speed. The eight lift rotors provide the thrust vector to operate during VTOL flight for taking-off, landing, hovering, and flying vertically. Moreover, the torque effect of the lift rotors assists the vehicle to change yaw heading.

The transitional flight from VTOL flight (thrust borne flight) to airplane flight (wing borne flight) of the box-wing multirotor vehicle 600 is described in the following section. Firstly, the pusher rotor 611 is powered up to propel the vehicle forward. Secondly, at a given forward speed, forward upper lift rotors 609 and rear upper lift 614 become unpowered, and the blades are stowed in parallel with the longitudinal axis of the fuselage to reduce aerodynamic drag. Consequently, the absence of rotor slipstream allows undisturbed ram airflow interacting with the upper wing 603 and lower wing 604 to generate airfoil lift. As a result, the sum of airborne lift force is contributed by the upper wing 603, lower wing 604 and forward lower lift rotors 610, and rear lower lift rotors 615. The vehicle is known to be in partial wing borne flight. Consequently, as the forward speed accelerates to the desired cruise speed, wing lift force increases, and lift rotor lift thrust decreases. Finally, upon reaching the desired forward cruise speed, the flight is fully transitioned to airplane flight when the total airborne lift force is provided by the upper wing 603 and lower wing 604. Moreover, forward lower lift rotors 610 and rear lower lift rotors 615 become unpowered and the blades of the forward lower lift rotors 610 and rear lower lift rotors 615 are stowed in parallel with the longitudinal axis to reduce aerodynamic drag. During airplane cruise flight, the forward pivotable rotor boom 607c and rear pivotable rotor boom 607d are retracted to the stowed position by rotating with respect to the vertical axis, as shown in FIG. 8. The rotating function allows the propulsion system to convert between the quad co-axial contra-rotating rotors to 8 non co-axial rotors. In airplane flight, the rudder 606, elevator 617 and aileron 618 provide the flight control surfaces to steer the vehicle in the pitch, roll and yaw axis. Finally, horizontal and vertical stabilizer 612 provides directional stability during airplane flight and might have hinged trim tabs to tune the heading, levelling, speed and attitude of the vehicle. Naturally, box-wing multirotor vehicle 600 can also operate in VTOL flight mode in the configuration shown in FIG. 8.

Naturally, there are numerous variations, modifications and configurations which may be made without departing from the scope of the disclosure invention. It should be understood that the embodiments are for illustrative and explanatory purpose, and it is not conceivable to identify exhaustively all possible embodiments. In particular, it is important to observe that the invention as described relates in particular to an aerial multirotor vehicle with specific positioning of lift rotors secured to the box-wing. The design of the box-wing benefits from an improvement of structural strength, fatigue strength and load carrying strength. The box-wing permits the lift rotors to be secured to the upper portion of the vehicle, which prevents the rotating blade from striking a person or object near the ground. Finally, the box-wing with a plurality of main wings design permits the wingspan to be reduced in the transverse direction. Nevertheless, the invention is applicable to any multirotor vehicle of arbitrary weight, such as a light drone to a large tonnage vehicle.

What is claimed is:

1. A box-wing multirotor aerial vehicle adapted for vertical take-off, vertical landing and horizontal airplane flight comprising:
   a detachable cabin;
   a fuselage base, said fuselage base comprising:
      a nose portion;
      a lower portion;
      an upper portion;
      a rear portion; and
      a tail portion;
   a fixed box-wing, said fixed box-wing comprising:
      a port side fixed box-wing structure, said port side fixed box-wing structure comprising:
         a stagger biplane arrangement composing a port side upper wing transversally extended from said upper portion of said fuselage base and a port side lower wing transversally extended from said lower portion of said fuselage base; and
         a port side pylon joining a distal end of said port side upper wing and a distal end of port side lower wing;
      a starboard side fixed box-wing structure, said starboard side fixed box-wing structure comprising:
         a stagger biplane arrangement including a starboard side upper wing transversally extended from said upper portion of said fuselage base and a starboard side lower wing transversally extended from said lower portion of said fuselage base; and
         a starboard side pylon joining a distal end of said starboard side upper wing and a distal end of said starboard side lower wing;
   a port side rudder is disposed on said port side pylon;
   a starboard side rudder is disposed on said starboard side pylon;
   a port side elevator is disposed on said port side upper wing;

a starboard side elevator is disposed on said starboard side upper wing;
a port side aileron is disposed on said port side lower wing;
a starboard side aileron is disposed on said starboard side lower wing;
a port side rotor boom, said port side rotor boom comprising:
  a port side rotor boom structure secured to said port side upper wing and said port side pylon;
  a port side rotor boom forward fixed structure is mounted with a first port side forward lift rotor;
  a port side rotor boom rear fixed structure is mounted with a first port side rear lift rotor;
  a port side rotor boom forward pivotable structure is mounted with a second port side forward lift rotor;
  a port side rotor boom rear pivotable structure is mounted with a second port side rear lift rotor;
a starboard side rotor boom, said starboard side rotor boom comprising:
  a starboard side rotor boom structure secured to said starboard side upper wing and said starboard side pylon;
  a starboard side rotor boom forward fixed structure is mounted with a first starboard side forward lift rotor;
  a starboard side rotor boom rear fixed structure is mounted with a first starboard side rear lift rotor;
  a starboard side rotor boom forward pivotable structure is mounted with a second starboard side forward lift rotor;
  a starboard side rotor boom rear pivotable structure is mounted with a second starboard side rear lift rotor;
a port side main landing gear secured to said port side pylon and said port side lower wing;
a starboard main landing gear secured to said starboard side pylon and said starboard side lower wing;
a horizontal and vertical stabilizer respectively secured on opposing sides of said rear portion of said fuselage base;
a pusher rotor secured to said tail portion of said fuselage base;
a landing gear secured to said nose portion of said fuselage base.

2. The box-wing multirotor vehicle as set forth in claim 1, wherein said detachable cabin is separable from said fuselage base by sliding forward to be loaded on a ground transportation device.

3. The box-wing multirotor vehicle as set forth in claim 1, wherein said detachable cabin comprising the usage to hold passenger, cargo, equipment and energy storage.

4. The box-wing multirotor vehicle as set forth in claim 1, wherein said first port side forward lift rotor, said first starboard side forward lift rotor, said first port side rear lift rotor, said first starboard side rear lift rotor, said second port side forward lift rotor, said second starboard side forward lift rotor, said second port side rear lift rotor, and said second starboard side rear lift rotor provide the thrust vector for taking-off, landing, hovering and flying vertically lift, and yaw heading torque effect.

5. The box-wing multirotor vehicle as set forth in claim 1, wherein said pusher rotor provides the forward propulsion thrust during airplane flight.

6. The box-wing multirotor vehicle as set forth in claim 1, wherein said fixed box-wing provides the airborne lift during airplane flight.

7. The box-wing multirotor vehicle as set forth in claim 1, wherein said rudders, elevators and ailerons provide pitch, roll and yaw control during airplane flight.

8. The box-wing multirotor vehicle as set forth in claim 1, wherein said horizontal and vertical stabilizer comprising of at least one or more fixed horizontal airfoil, fixed vertical airfoil, fixed diagonal airfoil and hinged trim tab.

9. The box-wing multirotor vehicle as set forth in claim 1, wherein said port side rotor boom forward pivotable structure, said port side rotor boom rear pivotable structure, said starboard side rotor boom forward pivotable structure and said starboard side rotor boom rear pivotable structure is rotatable with respect to a vertical axis.

\* \* \* \* \*